Patented Sept. 2, 1952

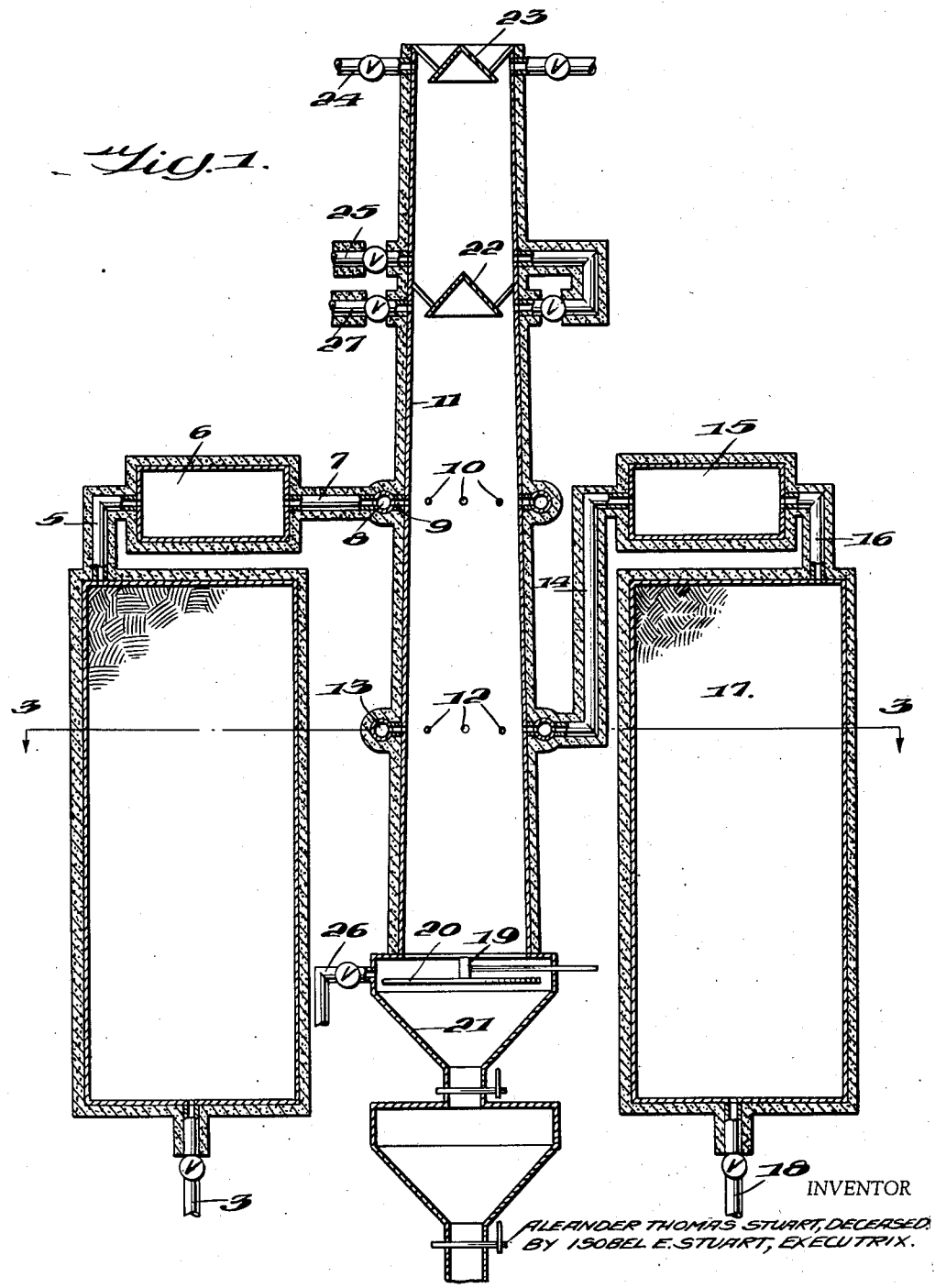

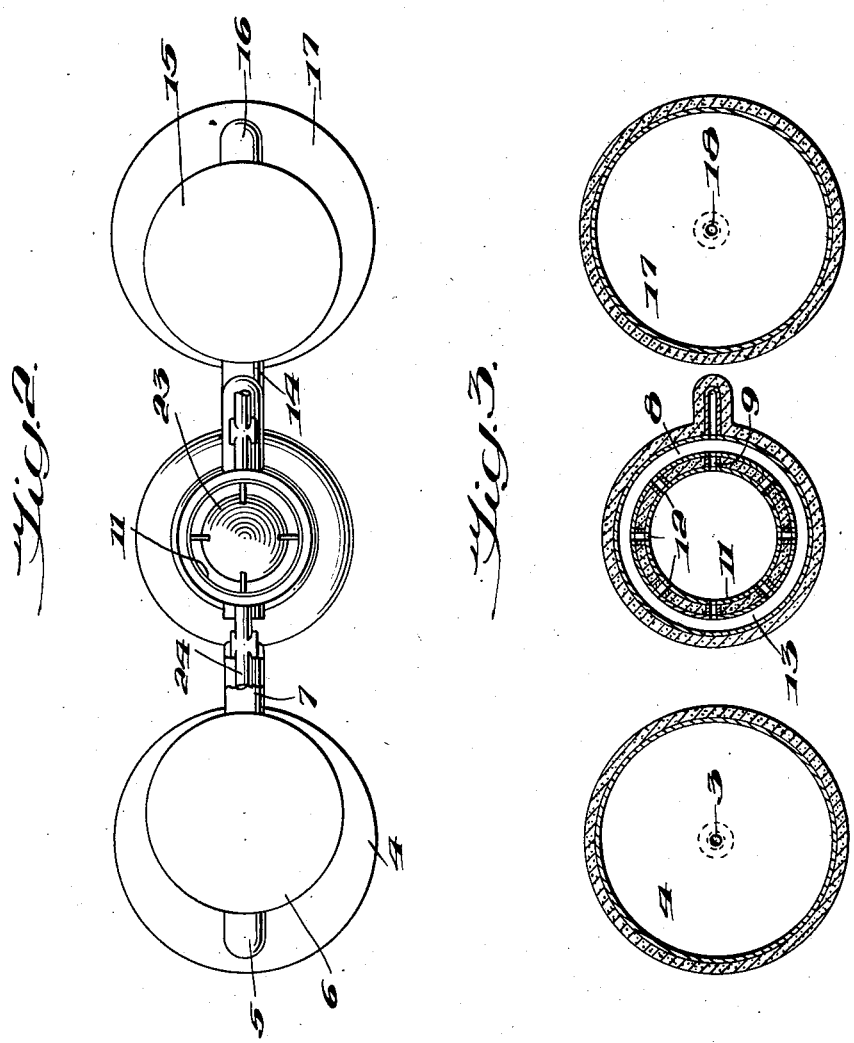

2,609,288

UNITED STATES PATENT OFFICE 2,609,288

PROCESS FOR THE REDUCTION OF METAL OXIDES BY GASES

Alexander Thomas Stuart, deceased, late of Toronto, Ontario, Canada, by Isobel E. Stuart, executrix, Toronto, Ontario, Canada Application March 8, 1950, Serial No. 148,672
In Canada, March 8, 1949

11 Claims. (Cl. 75—34)

This invention pertains to the reduction of metallic oxides to metal by gaseous means.

Steel companies and experts in many countries, at enormous expense, have attempted to commercialize a number of processes for the manufacture of sponge iron by gaseous reduction. Experience has taught that only two gases, hydrogen and carbon monoxide or mixtures thereof, are suitable as reducing agents, and that other fuels such as coal, coke, oil, natural gas and hydrocarbon gases should first be reformed into hydrogen and carbon monoxide gases. What little success has been met with heretofore, has been attained with an extravagant use of fuels and energy.

Most gaseous reduction processes involve the continuous movement of solids down a shaft or through a kiln in a direction countercurrent to a flow of preheated reducing gases. Under the most favourable circumstances, as governed by the equilibrium, only about ¼ of the gas can be utilized in a single pass; it is therefore necessary to cool the exiting gases and to remove the products ($H_2O$ and/or $CO_2$) before the unused portions can be recovered and reheated to 1900° F. for recirculation. Consequently, large quantities of heat are lost in radiation, in the gases leaving the reduction zone and in the heated products of reduction. Although some of this heat is recuperated in some processes, losses are still high.

Processes in use or under development depend upon the production of a mixture comprising a large portion of carbon monoxide with a smaller portion of hydrogen, for the reason that much less heat of reaction need be supplied than if hydrogen were used alone (i. e. approximately 188,000 B. t. u.'s versus 814,000 B. t. u.'s per 2000 lbs. of iron made). On the other hand, the standard methods of making water gas (the mixture of carbon monoxide and hydrogen) are wasteful in the use of coke and, furthermore, the use of carbon monoxide in the ore reducing apparatus tends to deposit carbon in the iron and to destroy the reducing power of the gas, especially when the apparatus is operated under pressure. Another objection is that carbon dioxide is formed in large quantities when carbon monoxide is used as a reducing agent and that it is a very expensive operation to remove $CO_2$ before recirculation of the excess reducing gases.

No apparatus or process is presently available which can use, as a reducing gas, either hydrogen alone, or hydrogen mixed with a minimum quantity of carbon monoxide. This is a matter of great concern in areas devoid of resources in coal, coke, oil and natural gas or in areas where fuels are too expensive to use for the manufacture of the reducing gases which are extravagantly used in known processes. In such areas there frequently are resources in water power by which pure hydrogen and oxygen can be economically generated by the electrolysis of water. The electrolytic hydrogen, without any fuel, can be used for the production of sponge iron which can be melted in electric furnaces for the production of steel ingots. Among the many industrial uses for the by-product oxygen, reference is made to the fact that oxygen is being used with a minimum quantity of coal or coke for the manufacture of water gas or even of further quantities of hydrogen.

It is obvious that there is great need in many regions for a process and apparatus capable of utilizing water power, with or without a minimum quantity of fuel, for the manufacture of sponge iron in small or in large tonnages. No known process in use or under development elsewhere has been designed or is capable of meeting these specifications for the manufacture of sponge iron. As an example, reference may be made to the huge deposits of high grade hematite ore in Quebec-Labrador border area in Canada, where water power is plentiful and where there are no resources in fuel of any kind.

Although the quantity of heat required by the chemical reactions is much greater, it has been established both on theoretical and experimental evidence that pure hydrogen is more desirable on other grounds than any mixture of hydrogen with carbon monoxide; for instance, it is known that pure hydrogen will reduce ore effectively at much lower temperatures than will any mixture with carbon monoxide. The present invention relates to a process and apparatus wherein hydrogen, or any mixture of hydrogen with carbon monoxide, is utilized for the reduction of ores in quantities little above the amounts theoretically needed and wherein heat losses are likewise little more than the theoretical. Accordingly, the present invention makes use of a closed circuit from which the gaseous products of reduction are continuously removed and the reducing gases are recirculated to their ultimate and full utilization. Likewise, the present invention makes use of a closed circuit as regards the heat contained in the solids and gases which leave the reduction zones.

Experiments have shown that about 75% of the reducing gas passes through the reduction zone without effecting any removal of oxygen from the solids and that this surplus gas transports much of the heat supplied to the reduction zone. It is therefore necessary to pass several times the quantity of fresh preheated gas through the reduction zone than would at first seem to be essential. Therefore, in order to localize and to expedite reduction within a short zone, it was found that it is preferable for the solids to rest periodically in the reduction zone while proportionally large quantities of preheated and fresh gases pass through the same zone, though it is to be understood that the invention is not limited to the solids resting in any zone. It was also found that the large quantity of heat transported from the reduction zone by the gases is much more than can be absorbed by ore descending a vertical shaft, and that a continuous vertical shaft apparatus of the usual type cannot be efficient.

Likewise, it was also found that a batch process is inefficient. If the solids remain at rest in an insulated container throughout a reduction process, it is necessary to pass an enormous quantity of hot gases through the solids in order to preheat, reduce and finally cool the product as well as the container itself each time. For the reason that a large batch would take many hours to complete a cycle and for the reason that only a small portion of the heat emitted by the gases can be recovered in preheating a second batch, it follows that heat losses are enormous.

In order to explain the invention simply, it will be illustrated as if the solids rested in each zone for sufficient time to complete any desired treatment, although it is to be understood that the invention is not limited to the solids resting in any of the zones. It may be pointed out that, if the solids descend the shaft continuously, they do so at a very slow rate and that the solids can be treated during their descent by gases as described herein.

One object of the invention is to use a shaft-type apparatus and to use two separate and independent gas circuits, one chiefly for reduction and the other chiefly for the transport of heat. The invention uses a relatively small reduction zone in which the preheated solids remain for a certain period of time. Freshly prepared and preheated gas is then passed through the reduction zone only and immediately withdrawn and passed to an apparatus capable of storing high temperature heat efficiently for a short time. The invention uses two apparatuses capable of storing heat and consequently the flow of heated gas may be repeatedly reversed whereby the ore in the reduction zone may be reduced from the top down and from the bottom up. When reduction is completed, this gas circuit is stopped and the solids are dropped within the shaft by removal of solids at the bottom.

By this means, the hot reduced metal is dropped from the reduction zone and is replaced by a preheated charge from above. More ore is then added to the top of the shaft and the second circuit of gas is introduced. For this, cooling gas is fed vertically up from the bottom to the top of the shaft and out to a gas holder. By this procedure, the heat content of the hot metal at the bottom of the shaft is washed upwards toward the top where the cold ore has been admitted. Hot gases are also passed into and through the reduction zone and thence up the shaft in order to raise the temperature in the reduction zone to the desired degree and in order to preheat some of the ore in the shaft above the reduction zone. Preheated solids now occupy the reduction zone and are ready for reduction by preheated gas.

Fresh reducing gas is preheated by passage through the heat storage unit and then is superheated to 1900° F. and fed directly into the reduction zone of the shaft. The hot gases are withdrawn immediately after passing through the reduction zone and then go to a second heat storage unit.

The gases which are cooled by passage through the heat storage units contain the unconsumed portions of reducing gas plus the steam and any carbon dioxide formed in the reduction zone. These products are removed by usual methods and surplus reducing gases go to a gas holder for recirculation. Make-up is added to the system and reducing gases are pumped back to the plant.

From the description, it will be seen that closed type gas circulators are used and that losses of reducing gases are negligible. Likewise, it will be seen that closed type circulators of sensible heat are used; the heat contained in the hot sponge iron is washed upwards to preheat the fresh charges of ore; the heat contained in the hot gases leaving the reduction zone are stored and washed back to the reduction zone in the succeeding cycle.

If desired, nitrogen may be added to the reducing gases to assist in the transport of heat, for which purpose the nitrogen content may be varied to any desired extent.

Hydrogen or a mixture of hydrogen and carbon monoxide may be used as the reducing agent, consequently the gaseous products of the reduction may be either steam alone or a mixture of steam and carbon dioxide. These products may be separated from the spent gases by usual commercial methods, and the unused portions of the reducing gases may be recovered for re-use. The process will be illustrated as if hydrogen alone at 1900° F. were used as the reducing agent, and as if the only gaseous product were steam; however, it is to be understood that the invention is not to be so limited and that a mixture of reducing gases at any suitable temperature may be used and that gaseous products other than steam may be formed.

Two or more heat storage units are used, either of the regenerator or recuperator types. The fresh hydrogen coming from the gas holder through a compressor is passed into the bottom of one of the heat storage units which has been heated in a previous cycle of operation. This preheated hydrogen is then heated to 1900° F. in passage through a super-heater before it enters the reduction zone of the tapered shaft. In the reduction zone of the shaft, possibly 25% of the hydrogen (as governed by the equilibrium conditions) picks up oxygen from the ore and forms steam, while the balance of the hydrogen passes through unchanged.

The hot mixture of steam and hydrogen from the reduction zone of the shaft then passes down through the interstices of the cold second heat storage unit, whereby the bricks become heated and the spent gases are cooled. The steam may condense to water, which can be removed while the cooled excess hydrogen passes out the bottom of the second heat storage unit through pipes back to the gas holder.

On the reverse cycle, the incoming hydrogen picks up the heat stored in the second unit and is superheated to 1900° F. before it is fed to the reduction zone of the shaft; from there the spent gas heats up the first mentioned heat storage unit and the excess hydrogen goes to the gas holder. Thus all waste heat is recuperated for use in the next succeeding cycle.

The heat consumed by the chemical reactions in the reduction zone of the shaft may be supplied in the superheater. This superheater takes in the hydrogen preheated by passage through one of the heat storage units and superheats it, by suitable regulating means, to 1900° F. before it is fed to the reduction zone of the shaft.

It will be seen that the superheater can supply all the heat necessary to make up the losses by the chemical reactions and by radiation. The superheater may be provided with internal electrical elements which heat the incoming hydrogen by passage over the surfaces of these electric resistance elements. On the other hand, the superheater may comprise a pipe coil heated externally by electric elements or by flames of burning fuel.

In a third method, the superheater may be similar in construction to a heat storage unit, described just above. The brick work of a superheater may be heated prior to the passage of hydrogen to a temperature at or above 1900° F. For this purpose hot combustion gases, made by burning gas or oil with a considerable excess of air (in order to hold the maximum temperature at a certain point), are used to preheat brick work; after purging with nitrogen and hydrogen, the apparatus is ready for use in superheating hydrogen.

It is obvious from the above description that the losses of hydrogen and the sensible heat contained in the solids and circulating gases will be very small, and that the actual consumption of hydrogen and of heat will be little more than the theoretical. The theoretical requirement of reducing gas, for the degree of deoxidation desired, is approximately 17,000 cubic feet per ton of iron; the theoretical heat requirement is 814,000 B. t. u. when pure hydrogen is used, or 188,000 B. t. u.'s when a mixture comprising $\frac{2}{3}$ carbon monoxide and $\frac{1}{3}$ hydrogen is used. When carbon monoxide alone is used, the process is exothermic.

In describing the invention reference will be made to the attached drawings, in which:

Figure 1 shows a front elevation of the equipment used for the reduction of oxides by hydrogen.

Fig. 2 is a top view of the apparatus.

Figure 3 shows a cross-section on the line 3—3 of Figure 1. All the apparatus is suitably heat insulated as indicated in the drawings.

In the drawings, 3 is a pipe leading hydrogen from a gasometer and compressor to the bottom of heat storage unit 4. Pipe 5 leads the preheated hydrogen from 4 into superheater 6, from which the hydrogen issues at 1900° F. by pipe 7. Pipe 7 then leads the hot hydrogen to bustle pipe 8, through tuyères 9 and ports 10 into the vertical tapered shaft 11. The hydrogen at approximately 1900° F. then travels down through the solids in shaft 11 to ports 12 and out to bustle pipe 13. The hot gases issuing from bustle pipe 13 travel by pipe 14 to unheated superheater 15; then by pipe 16 into the top of heat storage unit 17. The intersticed brick in 17 becomes heated from the top down while cooled excess hydrogen plus steam or condensate exit at the bottom by pipe 18. Pipe 18 leads the excess hydrogen back to the gas holders.

If desired, the flow of hydrogen may be reversed at any time. For this purpose the electricity is turned off in superheater 6 and is turned on in superheater 15. Then after the solids in the reduction zone of the shaft situated between ports 10 and 12 are completely reduced, the gas flow through the heat storage units as described is shut off by the closure of the cold valves on pipes 3 and 18 at the bottoms of the heat storage units.

The solids in the tapered shaft 11 are lowered by operating the discharge mechanism 19 which moves back and forth across plate 20 thereby pushing the solids into bin 21. When the solids below ports 12 are discharged into bin 21, they will be replaced by a like volume of hot sponge iron descending from the reduction zone in the shaft 11 between ports 10 and 12. Similarly, all other solids in the main shaft 11 will likewise descend, so that some of the space above ports 10 will become empty.

At the top of the main shaft 11 there is an ore holding compartment situated between the two ore feed bells 22 and 23. Bell 22 is opened and ore is dropped into the top of the main shaft 11. Bell 22 is then closed and bell 23 is opened while fresh ore is dropped into the ore holding compartment. After bell 23 is closed, the atmosphere of the ore holding compartment is purged by leading hydrogen in at the top through pipe 24 and out at the bottom through pipe 25.

In the main shaft 11, the situation may be that cold ore resides in the zone above ports 10; preheated ore resides in the reduction zone between ports 10 and 12; hot sponge iron resides in the zone below ports 12; bin 21 is empty.

The second type of hydrogen circulation is now introduced in order to transfer the heat contained in the hot sponge iron at the bottom of shaft 11 to the solids above ports 10. Cooling gas is therefore fed into bin 21 by pipe 26 and vertically upwards through the whole main shaft 11 to the outlet pipe 27 and thence back to the gas holder. This circulation is continued until the sponge iron in the bottom zone of the shaft is cooled. Hot gases are then injected at ports 12 and, by suitable manipulation of the outlet valves 3, 18 and 27, are caused to flow up the shaft 11 to outlet 27 and back to the gas-holder, in order to transport heat and to raise the temperature in the reduction zone above ports 12 to the desired degree and also to preheat and dry some of the ore residing above the ports 10.

To assist in the transport of heat the percentage of nitrogen in the circulating gases may be increased. Nitrogen is not consumed and, since a closed circuit is used, nitrogen is not lost and will continue to recirculate; therefore, in order to increase the percentage of nitrogen in the circulating gases, it is only necessary to reduce or cut off at any time the amount of make-up hydrogen being fed into the system.

The first type of hydrogen circulation previously described is now repeated, it being understood that the direction of flow of the reducing gases through the reduction zone is reversible. Fresh cool hydrogen enters the bottom of heat storage unit 17 by pipe 18, and the hydrogen thus preheated issues by pipe 16 into superheater 15 from which, by suitable regulation, it issues at 1900° F. The 1900° F. hydrogen then flows by pipe 14 into the ports 12 of shaft 11, up through the solids in the reduction zone and out at ports 10. Pipe 7 leads the spent gas through unheated superheater 6 and down pipe 5 into heat storage unit 4. From the bottom of unit 4, pipe 3 conveys any condensate to a water trap and leads excess hydrogen back to the gas holder. Likewise, the reverse flow will bring hot hydrogen into the reduction zone at ports 10 down through the solids in the reduction zone and out at ports 12 to heat storage unit 17 which now has become cool. This ends one complete cycle of operations.

Although the process as described involves the use of hydrogen, it is to be understood that other reducing gases may be used. When carbon dioxide is one of the gaseous products of reduction, it is removed from the cooled exit gases by usual means and excess carbon monoxide, as well as hydrogen, is recovered for re-use.

If desired, nitrogen may be added to the reducing gases to assist in the transport of heat. Also, the process and apparatus may be operated under considerable pressure.

It is to be understood that the same features can be applied to a stationary batch process, where the solids remain at rest during the whole complete cycle of preheating, reducing and cooling and are not lowered from one zone to another zone, as in a shaft process. For instance, a heat insulated receptacle may be used which is filled with a single batch of ore and reduced, after which the sponge iron may be removed either hot or cold.

However, a preferred form of process and apparatus have been described which combines the best features of a continuous shaft process with those of a batch process. The solids and gases may both enter and leave the apparatus at normal temperatures, thus indicating very high thermal efficiency. On the other hand, it is evident that the sponge iron can be discharged in a hot condition where that may be desired.

Heretofore, no process or apparatus has been developed which is capable of commercially producing sponge iron by means of pure hydrogen. Experts of the steel industry have pointed to the peculiar properties of hydrogen, its unique heat conductivity, etc., and to the larger quantities of heat which must be supplied to a hydrogen process and the large installations in heat exchangers of the usual type which would be required. In short, it has been claimed that pure hydrogen cannot be commercially used in the manufacture of sponge iron as melting stock. Obviously, these authorities anticipated the use of fuel for the production of heat and the necessity of a partition separating combustion gases from reducing gases through which heat must be transferred.

These and other technical difficulties were foreseen and fully considered in the development of the present invention. It was concluded that types of gas circulation, furnace-construction and heat exchangers new to the gaseous reduction process must be introduced; at the same time provision must be made by which high temperature heat can be recovered and re-used. Also, it became evident that there should be no essential change in the composition of atmosphere used in the process. For instance, it is undesirable to use an oxidizing atmosphere (i. e. hot combustion gases with excess air) in a process which primarily demands a reducing atmosphere, such as hydrogen.

Therefore the type of heat storage unit previously described is used in which, in addition to storing heat, heat exchange at virtually 100% efficiency is effected. This is done by avoiding any substantial change in the composition of the atmosphere of the heat storage units. This atmosphere may be reducing gas, with or without nitrogen flowing through the heat storage unit in one direction, or it may be reducing gas, with or without nitrogen, plus the gaseous products of reduction flowing in the opposite direction. The exchange of heat is effected by the gases, without any substantial change in composition, passing in either direction over the surface of the intersticed brick contained in the unit designated herein as a heat storage unit.

What is claimed is:

1. A process for the reduction of metal oxides without fusion which comprises the steps of feeding oxide ore to a furnace having preheating, reduction and cooling zones one below the other, preheating and effecting reduction of the ore by alternate cycles of gas circulation, the first cycle comprising the circulation of a hot gas through the reduction and preheating zones, the second cycle being a reducing cycle wherein hot reducing gas is circulated only through the reducing zone, withdrawing the gases from the furnace, repeating the reducing cycle until the ore is reduced, and removing the reduced metal from the furnace.

2. A process for the reduction of metal oxides without fusion which comprises the steps of feeding oxide ore to a furnace having preheating, reduction and cooling zones one below the other, preheating and effecting reduction of the ore by alternate cycles of gas circulation, the first cycle comprising the circulation of a hot gas through the reduction and preheating zones, the second cycle being a reducing cycle wherein hot reducing gas is circulated only through the reducing zone, withdrawing the gases from the furnace, repeating the reducing cycle until the ore is reduced, removing the reduced metal from the furnace, extracting heat and impurities from the withdrawn gases, and heating the gases to be used in new cycles of circulation by means of the extracted heat.

3. A process for the reduction of metal oxides without fusion which comprises the steps of feeding oxide ore to a furnace having preheating, reduction and cooling zones one below the other, preheating and effecting reduction of the ore by alternate cycles of gas circulation, the first cycle comprising the circulation of a hot gas through the reduction and preheating zones, the second cycle being a reducing cycle wherein hot reducing gas is circulated only through the reducing zone, withdrawing the gases from the furnace, repeating the reducing cycle until the ore is reduced, removing the reduced metal from the furnace, extracting heat and impurities from the withdrawn gases, heating the gases to be used in new cycles of circulation by means of the extracted heat, and superheating the reducing gas before it is recycled.

4. A process for the reduction of metal oxides without fusion which comprises the steps of feeding oxide ore to a furnace having preheating, reduction and cooling zones one below the other, preheating and effecting reduction of the ore by alternate cycles of gas circulation, the first cycle comprising the circulation of a hot gas through the reduction and preheating zones, the second cycle being a reducing cycle wherein hot reducing gas is circulated only through the reducing zone, withdrawing the gases from the furnace, repeating the reducing cycle until the ore is reduced, extracting heat and impurities from the withdrawn gases, heating the gases to be used in new cycles of circulation by means of the extracted heat, superheating the reducing gas before it is recycled, cooling the reduced metal by introducing a stream of cool gas at the bottom of the furnace, said gas after being heated by the reduced metal carrying heat to the other zones of the furnace.

5. A process for the reduction of metal oxides without fusion which comprises the steps of feeding oxide ore into a furnace having preheating, reducing and cooling zones one below the other, preheating and effecting the reduction of the ore by a series of separate cycles of gas streams, each of said gas streams passing through distinct zones in the furnace, the first cycle comprising the circulation of a hot gas through the reduction and preheating zones to effect preheating of the ore, the second cycle being a reducing cycle wherein a superheated reducing gas is introduced immediately adjacent the reducing zone and continuously withdrawn from the furnace after passing through the reducing zone, extracting heat and impurities from all of the withdrawn gases, using the extracted heat to heat the gases used in additional cycles, superheating the reducing gas and recycling it through the reduction zone until reduction is completed, cooling the reduced metal and transmitting heat to the reduction and preheating zones by introducing a stream of cool gas at the bottom of the furnace and withdrawing at the top of the furnace, manipulating the respective cycles of gas circulation to maintain the furnace at operating temperature, and removing cool reduced metal from the furnace.

6. A process for the reduction of metal oxides without fusion which comprises the steps of feeding oxide ore into a furnace having preheating, reducing and cooling zones one below the other, preheating and effecting the reduction of the ore by a series of separate cycles of gas streams, each of said gas streams passing through distinct zones in the furnace, the first cycle comprising the circulation of a hot gas through the reduction and preheating zones to effect preheating of the ore, the second cycle being a reducing cycle wherein a superheated reducing gas is introduced immediately adjacent the reducing zone and continuously withdrawn from the furnace after passing through the reducing zone, extracting heat and impurities from all of the withdrawn gases and using the extracted heat to heat the gases used in additional cycles, superheating the reducing gas consisting of hydrogen and recycling it through the reduction zone until reduction is completed, cooling the reduced metal and transmitting heat to the reduction and preheating zones by introducing a stream of cool gas at the bottom of the furnace and withdrawing at the top of the furnace, manipulating the respective cycles of gas circulation to maintain the furnace at operating temperature, and removing cool reduced metal from the furnace.

7. A process for the reduction of metal oxides without fusion which comprises the steps of feeding oxide ore into a furnace having preheating, reducing and cooling zones one below the other, preheating and effecting the reduction of the ore by a series of separate cycles of gas streams, each of said gas streams passing through distinct zones in the furnace, the first cycle comprising the circulation of a hot gas through the reduction and preheating zones to effect preheating of the ore, the second cycle being a reducing cycle wherein a superheated reducing gas is introduced immediately adjacent the reducing zone and continuously withdrawn from the furnace after passing through the reducing zone, extracting heat and impurities from all of the withdrawn gases and using the extracted heat to heat the gases used in additional cycles, superheating the reducing gas consisting of a mixture of hydrogen and an inert gas and recycling it through the reduction zone until reduction is completed, cooling the reduced metal and transmitting heat to the reduction and preheating zones by introducing a stream of cool gas at the bottom of the furnace and withdrawing at the top of the furnace, manipulating the respective cycles of gas circulation to maintain the furnace at operating temperature, and removing cool reduced metal from the furnace.

8. A process for the reduction of metal oxides without fusion which comprises the steps of feeding oxide ore into a furnace having preheating, reducing and cooling zones vertically disposed to each other in the aforesaid relationship, preheating and effecting the reduction of the ore by a series of separate cycles of gas streams, each of said gas streams passing through distinct zones in the furnace, the first cycle comprising the circulation of a hot gas through the reduction and preheating zones to effect preheating of the ore, the second cycle being a reducing cycle wherein a superheated reducing gas is introduced immediately adjacent the reducing zone and continuously withdrawn from the furnace after passing through the reducing zone, extracting heat and impurities from all of the withdrawn gases and using the extracted heat to heat the gases used in additional cycles, superheating the reducing gas consisting of a mixture of hydrogen, carbon monoxide and an inert gas and recycling it through the reduction zone until reduction is completed, cooling the reduced metal and transmitting heat to the reduction and preheating zones by introducing a stream of cool gas at the bottom of the furnace and withdrawing at the top of the furnace, manipulating the respective cycles of gas circulation to maintain the furnace at operating temperature, and removing cool reduced metal from the furnace.

9. A process as claimed in claim 1, in which the circulation of reducing gas during the second cycle is reversed.

10. A process as claimed in claim 5, in which the circulation of reducing gas during the second cycle is reversed.

11. A process as claimed in claim 5, in which the reducing gas consists essentially of hydrogen and carbon monoxide.

ISOBEL ELIZABETH STUART,
*Executrix of the Estate of Alexander T. Stuart, Deceased.*

REFERENCES CITED

The following references are of record in the file of this patent:

UNITED STATES PATENTS

| Number | Name | Date |
|---|---|---|
| 1,269,054 | Clark et al. | June 11, 1918 |
| 1,310,724 | Westberg | July 22, 1919 |
| 1,433,854 | Sending-Larsen | Oct. 31, 1922 |
| 1,824,960 | Lawaczeck | Sept. 29, 1931 |
| 2,142,100 | Avery | Jan. 3, 1939 |
| 2,166,207 | Clark | Jan. 13, 1939 |
| 2,231,760 | Foerster | Feb. 11, 1940 |
| 2,501,189 | Pike | Mar. 21, 1950 |

FOREIGN PATENTS

| Number | Country | Date |
|---|---|---|
| 71,534 | Sweden | July 14, 1927 |